United States Patent
Ohfuka et al.

[15] 3,691,110
[45] Sept. 12, 1972

[54] ANTISTATIC TREATING AGENT FROM POLYEPOXIDE-POLYAMINE REACTION

[72] Inventors: Toshio Ohfuka; Yasushi Ichikawa; Takeshi Ueda, all of Fuji, Japan

[73] Assignee: Asahi Kasel Kogyo Kabushiki Kaisha, Osaka, Japan

[22] Filed: June 2, 1970

[21] Appl. No.: 42,871

[30] Foreign Application Priority Data

June 11, 1969 Japan ......................44/45403

[52] U.S. Cl. ...260/2 EP, 117/138.8 A, 117/131.5 A, 252/8.8, 260/2 N, 260/29.2 EP, 260/348 R, 260/584 B
[51] Int. Cl. ..........................C08g 30/14, C08g 45/00
[58] Field of Search...260/2 EP, 2 N, 29.2 EP, DIG. 17, 260/DIG. 19, 348. R, 584 B; 117/138.8 A; 252/8.8

[56] References Cited
UNITED STATES PATENTS

| | | |
|---|---|---|
| 2,965,517 | 12/1960 | Albrecht et al.........117/138.8 |
| 3,278,460 | 10/1966 | Auerbach et al. ..............260/2 |
| 3,347,802 | 10/1967 | Ashby et al.....................260/2 |
| 3,462,383 | 8/1969 | Longoria et al. ..............260/9 |
| 3,420,794 | 1/1969 | May et al......................260/47 |

OTHER PUBLICATIONS

Chem. Abstracts, 65, 9196g (1966)

*Primary Examiner*—William H. Short
*Assistant Examiner*—E. Nielsen
*Attorney*—Cushman, Darby & Cushman

[57] ABSTRACT

Durable antistatic effects can be imparted to fibers by treating the fibers with a novel water-soluble polyamine either alone on in admixture with a polyepoxide compound. The novel water-soluble polyamine is obtained by reacting a polyamine with a polyol derivative having at least two glycidyl ether groups in one molecule and treating the reaction product, before it becomes water-insoluble, with a sulfite and/or a bisulfite.

18 Claims, No Drawings

ANTISTATIC TREATING AGENT FROM POLYEPOXIDE-POLYAMINE REACTION

BACKGROUND OF THE INVENTION

The present invention relates to a novel water-soluble polyamine for use as an antistatic treating agent which is obtained by reacting a polyamine with a polyol derivative having at least two glycidyl ether groups in one molecule and treating the reaction product, before it becomes water-insoluble, with a sulfite and/or a bisulfite; a process for preparing the said novel water-soluble polyamine; an antistatic treating agent comprising the said novel water-soluble polyamine and a polyepoxide compound having at least two epoxy groups in one molecule; a process for treating a textile material with the said antistatic treating agent; and a textile material treated with the said antistatic treating agent.

It is well known that a synthetic fiber has such a drawback that the fiber or a textile fabric made therefrom tends to accumulate an electrostatic charge. This electrostatic charge undesirably becomes not only a cause for making an unpleasant noise at the time of wearing and shedding of the textile fabric but also a cause for adhering dust or dirt onto the textile fabric In order to prevent the accumulation of such undesirable electrostatic charge, various antistatic treatment processes have been proposed. Some of these processes can provide so-called durable antistatic effects which do not substantially change by laundering or the like. A typical example thereof is a process in which a fiber is treated with a mixture comprising a glycerine glycidyl ether and a polyamine, which is a condensate of a polyethylene glycol dihalide with an alkylamine. The fiber treated according to the above-mentioned process is excellent in laundering resistance. It has been known that the polyamine employed in the said process contains a tertiary or quaternary amine, and it is inferred that said amine is fixed on the fiber together with the polyethylene glycol group to impart an effective antistatic effect to the fiber. However, in case the above-mentioned treatment is effected prior to dyeing of the fiber, there is brought about a problem concerning the dyeability of the fiber. That is, a synthetic fiber is dyed, in most cases, with an ionic dye such as a basic or acid dye. This is because the fiber becomes dyable by virtue of the presence of an acidic or basic group on the fiber. If a cationic group is made present as an antistatic agent on such fiber as mentioned above, the fiber tends to suffer from variations in dyeability, i.e. degradation in dyeability, decrease in dyeing speed, and unevenness in dyeability owing to unevenness caused in the antistatic treatment, with the result that a great problem is brought about in the production of textile fabrics.

SUMMARY OF THE INVENTION

As the result of extensive studies, the present inventors have found that durable antistatic effects can be imparted to fibers by treating the fibers with a novel water-soluble polyamine, either alone or in admixture with a polyepoxide compound, said water-soluble polyamine being obtained by reacting a polyamine with a polyol derivative having at least two glycidyl ether groups in one molecule and treating the reaction product, before it becomes water-insoluble, with a sulfite and/or a bisulfite.

DESCRIPTION OF THE PREFERRED EMBODIMENTS

The novel water-soluble polyamine employed in the present invention is obtained by reacting a polyamine with a polyol derivative having at least two glycidyl ether groups in one molecule and treating the reaction product, before it becomes water-insoluble, with a sulfite and/or a bisulfite. In this case, the polyamine and the polyol derivative having at least two glycidyl ether groups in one molecule, which initially are in the form of straight chains, gradually form a net work due to the reaction of amino groups with epoxy groups. When the reaction is continued for a long period of time or at a high temperature, a water-insoluble gel is formed. The time of formation of this gel varies depending on the equivalent ratio of amino groups to epoxy groups and the reaction time and temperature. It is therefore desirable that the time before the reaction product becomes water-insoluble is decided through experiments.

When the above-mentioned reaction is desired to be effected at one stage, the polyamine and the polyol derivative are mixed each other in a molar ratio of 2 : 3 to 10, preferably 2 : 4 to 7, and the resulting mixture is reacted at 30° to 90°C. In this case, if the amount of the polyol derivative is less than the said range, it is difficult to obtain a product excellent in laundering resistance, while if the amount thereof is larger than said range, not only the reaction is difficultly controlled to form easily a water-soluble gel but also the resulting product becomes inferior in laundering resistance. When the reaction is desired to be effected at two stages, the polyamine and the polyol derivative are mixed each other in a molar ratio of 2 : 1 to 2, the resulting mixture is reacted at about 90°C., and then the reaction product is further reacted at about 40° to 50°C. with the polyol derivative in the polyamine to polyol derivative molar ratio of 2 : 1 to 9.

The reaction of the polyamine with the polyol derivative may be effected in an anhydrous state. Alternatively, however, the reaction may be effected in water or in such an organic solvent as alcohol, ethylene glycol or the like. The use of such medium results in such advantages that the reaction can be carried out moderately and, in case the reaction system becomes high in viscosity, the viscosity is lowered to make the reaction uniform.

The reaction may be conducted according to any of batch-wise, semi-continuous and continuous processes such as, for example, a process in which the two components are mixed together and the resulting mixture is heated; a process in which one component is gradually added to the other component; a process in which the two components are continuously mixed and reacted each other in a reaction vessel maintained at a definite temperature; and a process in which the resulting product is continuously withdrawn. The two components are thus reacted at one or two stages, and then the reaction product is treated, before it becomes water-insoluble, with 10 to 80 mole percent based on the polyol derivative of a sulfite and/or a bisulfite. It is inferred that by this treatment, unreacted epoxy group reacts with the sulfite and/or bisulfite and is brought into the form of sulfohydrin. This reaction is effected easily and, when the molar ratio is suitably selected, substantially all of the sulfites is brought to an organically bonded state. In this case, it is desirable to so select the molar ratio, taking the amount of unreacted epoxy group into consideration, that the sulfite and/or bisulfite used are not left unreacted. This is because if the sulfite and/or bisulfite are left unreacted, there are brought about undesirable rust formation and the like. Whether these inorganic salts are left unreacted or not can easily be examined by oxidizing an aqueous solution of the resulting polyamine and then adding barium chloride to the solution. When these sulfite and/or bisulfite are reacted, the reaction product becomes more alkaline, so that the pH is lowered to weakly acidic by addition of a mineral or organic acid, whereby the product becomes higher in stability. By this treatment, the desired treating agent of the present invention can be produced.

As the polyamine in the present invention, there may be used any of known polyamines such as polyethylenepolyamines, e.g. ethylenediamine, diethylenetriamine and triethylenetetramine; polypropylenepolyamines, e.g. dipropylenetriamine; and 1,4-diaminocyclohexane. Further, as the polyol derivative having at least two glycidyl ether groups in one molecule, there may be shown such a bifunctional compound represented by the general formula,

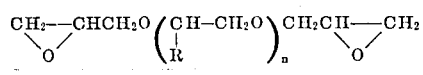

wherein $n$ represents an integer of 3 to 40, and R represents H or $CH_3$. Typical examples of the compound represented by the above-mentioned general formula are polyethylene glycol diglycidyl ether, polypropylene glycol diglycidyl ether, etc.

As mentioned previously, the reaction according to the present invention can be effected at two stages. In this case, there may be used as a compound to be reacted with the polyamine at the first stage, in addition to the compound represented by the aforesaid general formula, a reactive derivative of polyol capable of reacting with a known amino group which is represented by the general formula,

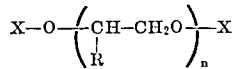

wherein $n$ represents an integer of 3 to 40, X represents

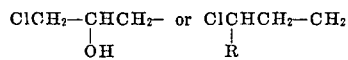

and R represents H or $CH_3$. Typical examples of the said compound are polyethylene glycol dichloride, polypropylene glycol dichloride, polyethylene glycol bischlorohydrin and polypropylene glycol bischlorohydrin.

The sulfite and bisulfite employed in the present invention include sodium, potassium and ammonium sulfites and bisulfites. These may be used either alone or in combination of two or more.

The novel polyamine in accordance with the present invention, even when used singly, can impart laundering resistant antistatic effects to fibers. However, when used in combination with a polyepoxide compound, the present polyamine can provide antistatic effects more favorable in laundering resistance. The polyepoxide compound employed in the present invention contains at least two epoxy groups in one molecule. Typical examples of such compound are polyepoxides of polyols, i.e. compounds derived from glycerine, ethylene glycol, polyethylene glycol, polypropylene glycol, etc. and epichlorohydrin.

The ratio of the novel polyamine of the present invention to the polyepoxide may be suitably decided in consideration of the desired antistatic effect and the feeling of the treated fibers. Generally, however, it is preferable that the said ratio is within the range from 1 : 0.3 to 1 : 5. In order to further enhace the antistatic effect of a mixture of said two members according to curing by action of the epoxide, the mixture may be incorporated with a catalyst. Examples of the catalyst are zinc borofluoride, dicyandiamide, aminoethyl piperazine, boron trifluoridemonoethylamine complex and trisdimethylaminomethylphenol. This mixture is usable within a range from weakly acidic to alkaline pH of 4 to 10. Generally, however, the mixture used at an alkaline pH tends to decolor the treated fiber.

Fibers capable of being treated with the water-soluble polyamine of the present invention include various synthetic fibers such as acrylonitrile, polyamide, polyester, vinyl chloride, vinylidene chloride, polypropylene, polyurethane and polyvinyl alcohol fibers. Further, the polyamine of the present invention is applicable as well to semi-synthetic fibers, regenerated fibers and various natural fibers. In the treatment of fibers, the polyamine of the present invention may be applied at any stage where the fibers are in the form of tows, staple fibers, spun yarns, half-finished products or finished products, so as to be in conform to the desired object.

In treating each of the above-mentioned fibers with a mixture of the water-soluble polyamine of the present invention and the aforesaid polyepoxide compound, there is adopted such a procedure as mentioned below.

One to 200 parts, preferably 4 to 50 parts of the mixture is dissolved in 1,000 parts of water. The resulting aqueous solution is adjusted to a desired pH, and the fiber is immersed in the solution. Alternatively, the solution may be showered on the fiber. Subsequently, the treated fiber is dried at a temperature of preferably 30° to 100°C. By this drying, the water-soluble polyamine becomes difficultly removable from the fiber even when the fiber is subjected to laundering and the like. If necessary, the polyamine can be cured by heat treating the dried fiber. The heat treatment temperature varies depending on the kind of the fiber, but is below 140°C., in general. The fiber thus treated with the water-soluble polyamine of the present invention not only has an excellent antistatic property but also is soft and favorable in feeling, and these excellent properties are maintained even after laundering.

The treating a fiber with the water-soluble polyamine according to the present invention, any of the known surfactants, smoothing agents, plasticizers, rust inhibitor, water repellents, antistatic agents and emulsifiers may be used in combination for such purposes as improvement in feeling, impartment of rust inhibiting property, impartment of water repellency, impartment of water absorptivity, etc.

Even when the polyamine of the present invention is applied to a fiber prior to dyeing, no substantial change in dyeability of the treated fiber is observed, and the fiber can be dyed to a brilliant and fast color with favorable dyeability. Particularly when the polyamine of the present invention is applied to an acrylonitrile fiber, the fiber shows no great change in dyeability for basic dyes. This is considered ascribable to the fact that the polyamine according to the present invention contains a tertiary amine and sulfonic acid, and therefore the fiber is less affected by the said dyes. This fact results in great advantages in treating the fibers at the stage of original yarns, tows or staple fibers. Further, when the treatment with the polyamine of the present invention is applied at the stage of production of synthetic fibers, the management in quality of the fibers can be effected more advantageously and uniformly than in the case where finished products are treated in several to several ten final processing plants.

The present invention is illustrated in further detail below with references to examples.

EXAMPLE 1

A polyethylene glycol having a molecular weight of 600 was reacted with epichlorohydrin and then treated with caustic soda to obtain a polyethylene glycol diglycidyl ether (A). To 1 mole of the ether (A) was added 0.4 mole of diethylenetriamine, and the resulting mixture was reacted at 40°C. Before the reaction product became water-soluble, 0.2 mole of ammonium sulfite was added to the reaction system to prepare a polyamine (B). Further, a polyethylene glycol having a molecular weight of 400 was treated in the same manner as above to obtain a polyethylene glycol diglycidyl ether (C).

5 parts of the polyamine (B) was mixed with 6 parts of the ether (C), and the mixture was charged into 189 parts of water to form a homogeneous solution, which was then adjusted to pH 6.5. A tow of acrylonitrile synthetic fiber was immersed in the thus formed aqueous solution, squeezed to a squeeze ratio of 25 percent and then dried at 80°C. This fiber had, before the treatment, a surface resistivity of $5 \times 10^{13} \Omega$, but when subjected to laundering after the treatment, the fiber showed a surface resistivity of $4 \times 10^9 \Omega$. This value scarcely changed even when the laundering time was increased.

EXAMPLE 2

The polyamine (B) prepared in Example 1 and a control polyamine (D), which had been prepared in the same manner as in Example 1 except that the ammonium sulfite was not used, were investigated in influence on dyeability of a treated fiber.

For the investigation, there were employed the measurement of dye exhaustion of treated fiber and a level-dyeing property test method.

The dye exhaustion was represented by a value obtained in such a manner that a treated fiber was dyed with 9.7 percent owf of Sevron Green B (trade name for a dye produced by Du Pont) at 100°C. for 75 minutes, and the dye absorption of the fiber after dyeing was measured according to absorption method.

The level-dyeing property test method was carried out in such a manner that several samples of a treated fiber were individually formed into a spun yarn, continuously knitted by use of a knitting machine and then dyed to a blue color, and the level-dyeing property of each sample was evaluated by the color difference between corresponding portions of the knitted fabric. According to this method, the level-dyeing property can be clearly evaluated at the boundaries of the portions since the samples have been continuously knitted. Further, the evaluation of color difference was effected according to color difference units of blue scale determined by NBS method which was similar to the gray scale employed in dyeing fastness test. This blue scale was composed of combination of different two color plates and was so designed that the color difference was by 0.5, 1.0, 1.5, 2.0 units and so on. The color difference was visually evaluated in comparison with the said standard color difference plates.

In this example, there were used the aforesaid polyamines (B) and (D) and, as the polyepoxide, the ether (C) prepared in Example 1. The amounts of these compounds used in the treating bath of each run were as follows:

Run 1: No polyamine nor polyepoxide were used.
Run 2: 2.5 percent of the polyamine (B) and 3 percent of the polyepoxide (C); pH 6.5.
Run 3: 5.5 percent of the polyamine (B); pH 6.5.
Run 4: 2.5 percent of the polyamine (D) and 3 percent of the polyepoxide (C); pH 6.5.
Run 5: 5.5 percent of the polyamine (D); pH 6.5.

Using the above-mentioned treating bath, a tow of acrylonitrile synthetic fiber was treated in the same manner as in Example 1. The surface resistivity of the fiber after 30 times' laundering and the dye exhaustion and level-dyeing property thereof before laundering are shown in Table 1.

TABLE 1

| Run No. | Surface resistivity after 30 times' laundering ($\Omega$) | Dye exhaustion (%) | Level -dyeing property |
|---|---|---|---|
| 1 | $5 \times 10^{15}$ | 45.2 | 0 |
| 2 | $5 \times 10^9$ | 45.1 | 0 |
| 3 | $5 \times 10^{10}$ | 45.0 | 1 |
| 4 | $1 \times 10^{11}$ | 42.7 | 2 |
| 5 | $2 \times 10^{12}$ | 42.5 | 2.5 |

Note: Run Nos. 1, 4 and 5 are control examples. The level-dyeing property is the maximum value among samples of same kind.

EXAMPLE 3

1 mole of a polyethylene diglycidyl ether derived from a polyethylene glycol having a molecular weight of 400 was reacted with 0.5 mole of ethylenediamine at 35°C. for 4 hours, and further reacted with 0.4 mole of sodium bisulfite to obtain a polyamine. To 2 parts of this polyamine was added 2 parts of a polyepoxide formed by reacting glycerine with epichlorohydrin followed by dechlorination. The resulting mixture was dissolved in 96 parts of water to prepare a homogenous solution of pH 4.8. Using this solution as a treating bath, a tow of acrylonitrile synthetic fiber was treated according to shower method, and then dried at 60°C. The thus treated tow showed a prominent antistatic effect and had a sufficiently high laundering resistance. Further, the dye exhaustion and level-dyeing property of the treated tow did not differ from those of the untreated tow.

EXAMPLE 4

732 parts of a glycidyl ether of a polypropylene glycol having a molecular weight of 600 was reacted with 52.4 parts of dipropylenetriamine in the same manner as in Example 1, and then treated with 37.8 parts of anhydrous sodium sulfite to obtain a polyamine. To 3 parts of this polyamine was added 1.5 parts of an ethylene glycol diglycidyl ether derived from ethylene glycol, and the resulting mixture was dissolved in a mixed solution comprising 25.5 parts of ethyl alcohol and 70 parts of water to prepare a homogeneous solution of pH 9. Thereafter an undyed nylon cloth was immersed in the thus prepared solution, hydroextracted by a centrifugal hydroextractor and then dried at 80°C. for 20 minutes. This nylon cloth had, before the treatment, a surface resistivity of $1 \times 10^{14} \Omega$. Even when repeatedly subjected to 40 times' laundering after the treatment, the cloth showed a surface resislivity of $8 \times 10^9 \Omega$. The cloth was subjected to dyeing, but no unevenly dyed portion was observed in the treated cloth, and the hue thereof was not different from that of the untreated cloth.

EXAMPLE 5

0.5 mole of the polyethylene diglycidyl ether (A) obtained in Example 1 was reacted at 80°C. with 1 mole of diethylenetriamine, and then the reaction mixture was further reacted at 40°C. with 1.5 moles of the ether (A).

Before the reaction product became water-soluble, 0.5 mole of potassium bisulfite was added to the reaction system and reacted with the reaction mixture to obtain a polyamine. This polyamine was formed into a 25 percent aqueous solution, which was then adjusted to pH 6.8 by addition of hydrochloric acid. 33 parts of the thus obtained aqueous polyamine solution was charged with 8 parts of a glycerine diglycidyl ether and then with 282 parts of water to prepare a homogeneous aqueous solution of pH 8. In this aqueous solution was immersed a staple fiber having a monofilamentary denier of 3 which had been obtained from an acrylonitrile polymer comprising 94 percent of acrylonitrile and 6 percent of methyl acrylate. After squeezing, the fiber was dried at 90°C. and then subjected to wet heat treatment at 120°C. The thus treated fiber was subjected to spinning and then knitted to an ordinary sweater. This sweater made no discharge noise at the time of shedding even at a low humidity and was markedly less in adhesion of dust. These effects scarcely changed even when the sweater was repeatedly subjected to ordinary dry-cleaning. Further, the dyeability of the sweater did not differ at all from that of a sweater obtained without any such treatment as mentioned above.

EXAMPLE 6

A solution comprising 0.7 mole of a diglycidyl ether (E) derived from a polyethylene glycol having a molecular weight of 300, 1 mole of triethylenetetramine and 150 parts of water was reacted with stirring at 90°C. for 2 hours. The reaction solution was further charged with 3 moles of the ether (E) and water, and reacted at 40°C. for 30 minutes with thorough stirring under such conditions that the concentration of organic component in the system became 30 percent. Subsequently, 0.75 mole of potassium sulfite was added to the system, and the reaction was further continued to obtain an aqueous polyamine solution. 90 parts of the thus obtained aqueous polyamine solution was charged with 30 parts of a glycerine diglycidyl ether and 2,500 parts of water, and then adjusted to pH 6.0 to prepare a treating bath. In this treating bath were individually immersed an acrylic underwear, a nylon slip, a polyester shirt and a polypropylene work wear (all of which were commercially available products and were used after scouring). Thereafter, the products were centrifugally hydroextracted to a hydration ratio of 50 percent, and then dried in hot air at 90°C. for 30 minutes. The surface resistivity values of the thus treated products after 25 times' laundering are shown in Table 2 in comparison with those of non-treated products.

TABLE 2

(Measurement conditions: 21°C. × 64 % (RH)

| Kinds of products | Treated product (after 25 times' laundering) | Non-treated product (after 25 times' laundering) |
|---|---|---|
| Acrylic underwear | $1 \times 10^{10} \Omega$ | $4 \times 10^{13} \Omega$ |
| Nylon slip | $3 \times 10^{10} \Omega$ | $7 \times 10^{13} \Omega$ |
| Polyester shirt | $8 \times 10^{10} \Omega$ | $1 \times 10^{13} \Omega$ |
| Polypropylene work wear | $7 \times 10^{10} \Omega$ | $1 \times 10^{14} \Omega$ |

Every product did not substantially change in feeling before and after the treatment and showed no thermal coloration.

EXAMPLE 7

A polyethylene glycol having a molecular weight of about 1,500 was reacted with epichlorohydrin and then treated with caustic soda to obtain a polyethylene glycol diglycidyl ether (F). 1 mole of the thus obtained ether (F) was reacted at 40°C. with 0.5 mole of 1,4-diaminocyclohexane. Before the reaction product became water-insoluble, 0.4 mole of sodium sulfite was added and reacted to prepare a polyamine (G).

5 parts of the polyamine (G) was charged with 6 parts of the ether (C) obtained in EXAMPLE 1 and then with 189 parts of water to form a homogeneous solution, which was then adjusted to pH 6.5. A tow of acrylonitrile synthetic fiber was immersed in the thus obtained solution, squeezed to a squeeze ratio of 25 percent and then dried at 80°C. This fiber had, before the treatment, a surface resistivity of $5 \times 10^{13} \Omega$. However, the treated fiber showed a surface resistivity of $9 \times 10^{10} \Omega$ even after 30 times' laundering.

What is claimed is:

1. A water-soluble polyamine obtained by reacting a polyamine selected from the group consisting of ethylenediamine, polyethylenepolyamines, polypropylenepolyamines, and 1,4-diaminocyclohexane with a glycidyl ether of a polyol having the general formula

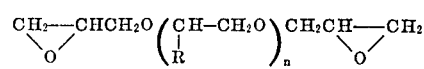

wherein n represents an integer of 3 to 40; and R represents H or $CH_3$, and treating the reaction product, before it becomes water-insoluble with at least one member selected from the group consisting of sulfites and bisulfites.

2. A water-soluble polyamine according to claim 1, wherein the polyamine is one member selected from the group consisting of ethylenediamine, diethylenetriamine, triethylenetetramine, dipropylenetriamine and 1,4-diaminocyclohexane.

3. A water-soluble polyamine according to claim 1, wherein the sulfites and bisulfites are selected from the group consisting of sodium, potassium and ammonium sulfites and bisulfites.

4. A water-soluble polyamine according to claim 1, wherein the molar ratio of the polyamine to the polyol derivative is 2 : 3 to 10, preferably 2 : 4 to 7, and the reaction is effected at a temperature of about 30° to 90°C.

5. A water soluble polyamine according to claim 1, wherein at least one of the sulfites and bisulfites is used in an amount of 10 to 80 mole percent based on the amount of the polyol derivative.

6. A water-soluble polyamine according to claim 1 wherein the reaction of the polyamine with the glycidyl ether of the polyol is effected in two stages in which at the first stage, the molar ratio of the polyamine to the polyol derivative is 2:1 to 2 and the reaction is effected at a temperature of about 30° to 90°C., and, at the second stage, the molar ratio of the polyamine to the polyol derivative is 2:1-9 and the reaction is effected at a temperature of about 40° to 50°C.

7. A water-soluble polyamine according to claim 6, wherein the polyol derivative to be reacted with the polyamine at the first stage is one member selected from the group consisting of compounds represented by the general formula,

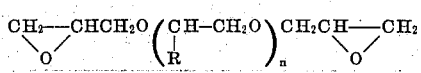

wherein $n$ represents an integer of 3 to 40; and R represents H or $CH_3$, and compounds represented by the general formula,

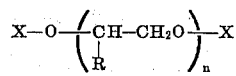

wherein n and R are as defined above; and X represents

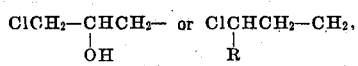

where R is as defined above.

8. A process for producing a water-soluble polyamine which comprises reacting a polyamine selected from the group consisting of ethylenediamine, polyethylenepolyamines, polypropylenepolyamines, and 1,4-diaminocyclohexane with a glycidyl ether of a polyol having the general formula

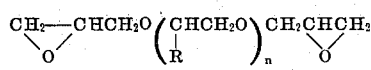

wherein $n$ represents an integer of 3 to 40; R represents H or $CH_3$, and then treating the reaction product, before it becomes water-insoluble, with at least one member selected from the group consisting of sulfites and bisulfites.

9. A process according to claim 8, wherein the polyamine is one member selected from the group consisting of ethylenediamine, diethylenetriamine, triethylenetetramine, dipropylenetriamine and 1,4-diaminocyclohexane.

10. A process according to claim 8, wherein the sulfites and bisulfites are selected from the group consisting of sodium, potassium and ammonium sulfites and bisulfites.

11. A process according to claim 8, wherein the molar ratio of the polyamine to the polyol derivative is 2 : 3 to 10, 2 : 4 to 7, and the reaction is effected at a temperature of about 30° to 90°C.

12. A process according to claim 8 wherein the reaction of the polyamine with the glycidyl ether of the polyol is effected in two stages in which at the first stage, the molar ratio of the polyamine to the polyol derivative is 2:1 to 2 and the reaction is effected at a temperature of about 30° to 90°C., and, at the second stage, the molar ratio of the polyamine to the polyol derivative is 2:1 to 9 and the reaction is effected at a temperature of about 40° to 50°C.

13. A process according to claim 12, wherein the polyol derivative to be reacted with the polyamine at the first stage is one member selected from the group consisting of compounds represented by the general formula,

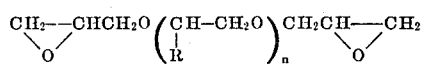

wherein $n$ represents an integer of 3 to 40; and R represents H or $CH_3$, and compounds represented by the general formula,

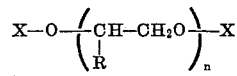

wherein n and R are as defined above; and X represents

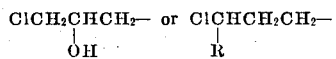

where R is as defined above.

14. A process according to claim 8, wherein at least one of the sulfites and bisulfites is used in an amount of 10 to 80 mole percent based on the amount of the polyol derivative.

15. An antistatic treating agent which comprises a mixture of the water-soluble polyamine of claim 1 and a polyepoxide compound having at least two epoxy groups in one molecule.

16. An antistatic treating agent according to claim 15, wherein the polyepoxide compound having at least two epoxy groups in one molecule is derived from epichlorohydrin and a polyol selected from the group consisting of glycerine, ethylene glycol, polyethylene glycol and polypropylene glycol.

17. An antistatic treating agent according to claim 15, wherein the molar ratio of the polyamine to the polyepoxide compound is 1 : 0.3 to 1 : 5.

18. An antistatic treating agent according to claim 15, wherein is used a catalyst selected from the group consisting of zinc borofluoride, dicyandiamide, aminoethyl piperazine, boron trifluoride-monoethylamine complex and tris-dimethylaminomethylphenol.

* * * * *

UNITED STATES PATENT OFFICE
CERTIFICATE OF CORRECTION

Patent No. 3,691,110    Dated September 12, 1972

Inventor(s) Toshio Ohfuka et al

It is certified that error appears in the above-identified patent and that said Letters Patent are hereby corrected as shown below:

Item 73, the second word in the name of the assignee should be changed from "Kasel" to --Kasei--.

Signed and sealed this 17th day of April 1973.

(SEAL)
Attest:

EDWARD M. FLETCHER, JR.　　　　　　ROBERT GOTTSCHALK
Attesting Officer　　　　　　　　　　Commissioner of Patents